UNITED STATES PATENT OFFICE.

ERHARD WITTE, OF GROSS-LICHTERFELDE, NEAR BERLIN, GERMANY, ASSIGNOR TO CHEMISCHE FABRIK AUF ACTIEN (VORM. E. SCHERING,) OF BERLIN, GERMANY.

MANUFACTURE OF ACETYL DERIVATIVES OF THE ALKYLATED IMINOPYRIMIDINS.

1,053,690.  Specification of Letters Patent.  Patented Feb. 18, 1913.

No Drawing.  Application filed August 23, 1909. Serial No. 514,228.

*To all whom it may concern:*

Be it known that I, ERHARD WITTE, doctor of philosophy, chemist, citizen of the German Empire, residing at Gross-Lichterfelde, near Berlin, German Empire, have invented a new and useful Improvement in the Manufacture of Acetyl Derivatives of the Alkylated Iminopyrimidins, of which the following is a specification.

According to this invention the hitherto unknown acetyl derivatives of the alkylated iminopyrimidins are obtained, corresponding to the formula

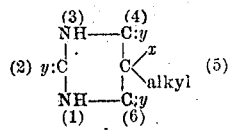

in which $x$ is meant for a hydrogen atom or alkyl, $y$ signifies O or NH or N.COCH$_3$, but one $y$ always represents N.COCH$_3$.

The compounds are colorless, odorless and tasteless, they are soluble in concentrated alcohol and when mixed with water or aqueous acids split off the acetyl group and are transformed into the corresponding alkyl barbituric acid.

These acetyl derivatives are obtained by treating the alkylated iminopyrimidins with acetylating agents.

*Examples.*

1. 2 parts by weight of 5-diethyl-2-imino-4,6-dioxypyrimidin are well stirred with 7.5 parts by weight of anhydrous acetic acid for about three hours at 40 to 50° centigrade. The resulting solution is filtered off from any impurities and on cooling the 5-diethyl-2-acetylimino-4,6-dioxypyrimidin separates out in fine crystals. The reaction takes place in accordance with the following equation:

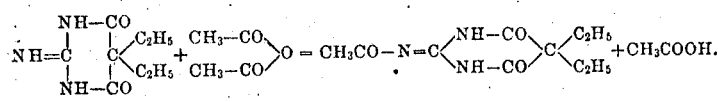

At a lower temperature the reaction takes place more slowly, at a higher temperature more quickly. The acetyl derivative melts about 176° centigrade. It dissolves in glacial acetic acid and acetic anhydrid and can be recrystallized from alcohol.

2. 18 parts by weight of 5-diethyl-2-imino-4,6-dioxypyrimidin are gently boiled with 50 parts by weight of glacial acetic acid and 20 parts by weight of acetyl chlorid for about six hours. When the resulting solution cools, a crystalline compound separates out, which is recrystallized from alcohol or glacial acetic acid.

In this example the hydrochlorid of the 5-diethyl-2-acetyl-imino-4,6-dioxypyrimidin is produced which decomposes on heating to about 240° centigrade. Like the acetyl compound itself the hydrochlorid is transformed by treatment with water into the corresponding alkylbarbituric acid.

3. 10 parts by weight of 5-dipropyl-2-imino-4,6-dioxypyrimidin are heated to the boil with 40 parts by weight of anhydrous acetic acid. On cooling the 5-dipropyl-2-acetylimino-4,6-dioxypyrimidin separates out from the solution produced in beautiful crystals. The melting point of the compound crystallized from alcohol or glacial acetic acid or anhydrous acetic acid is about 184 to 186° centigrade.

4. 1.8 parts by weight of 5-diethyl-2,4-diimino-6-oxypyrimidin are heated to the boil with 5 parts by weight of anhydrous acetic acid. The melting point of the 5-diethyl-2,4-diacetylimino-6-oxypyrimidin which separates from the resulting solution on cooling is about 136 to 138° centigrade.

For the purpose of acetylization the 5-diethyl-2,4-diimino-6-oxypyrimidin may also be heated to the boil with 5 parts of glacial acetic acid, a little more than the theoretical quantity of anhydrous acetic acid being then added. In this case also 5-diethyl-2,4-diacetylimino-6-oxypyrimidin is produced.

5. 1.5 parts by weight of 5-monoethyl-2-imino-4,6-dioxypyrimidin are heated with 3 parts by weight of anhydrous acetic acid to the boil. The acetylization is hastened by the addition of a small quantity of concentrated sulfuric acid. The 5-mono-ethyl-2-acetylimino-4,6-dioxypyrimidin separates out on cooling in fine flat crystals, which on recrystallization from alcohol begin to melt at about 202° centigrade.

The higher homologues of the last mentioned compounds can be obtained in a similar manner and also the acetyl compounds of the 5-dialkyl-4-imino-2,6-dioxypyrimidins (the 5-diethyl-4-acetylimino-2,6-dioxypyrimidin melts when crystallized from strong alcohol at about 158 to 159° centigrade) and of the alkylated triiminopyrimidin.

The herein described new chemical compounds have soporific properties and can be used as soporifics or hypnotics, or they may be employed for the production of dialkylated barbituric acid.

I claim as my invention:

1. The herein described new chemical compounds which are the acetyl derivatives of the alkylated iminopyrimidins and are colorless, odorless and tasteless substances, soluble in concentrated alcohol, and are converted into the corresponding alkyl barbituric acids by the action of water or aqueous acids.

2. As new chemical compound the 5-diethyl-2-acetylimino-4,6-dioxypyrimidin corresponding to the formula.

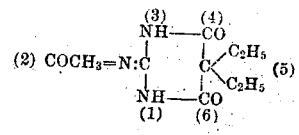

being soluble in concentrated alcohol, glacial acetic acid and acetic anhydrid, and being converted into diethyl barbituric acid by the action of water or aqueous acids.

3. The process of manufacturing the acetyl derivatives of alkylated iminopyrimidins, which consists in causing an acetylating agent to act upon alkylated iminopyrimidins and isolating the formed acetyl derivative, substantially as described.

In testimony whereof I have hereunto set my signature in the presence of two subscribing witnesses.

ERHARD WITTE.

Witnesses:
HENRY HASPER,
WOLDEMAR HAUPT.